US011308593B2

(12) United States Patent
Han et al.

(10) Patent No.: US 11,308,593 B2
(45) Date of Patent: Apr. 19, 2022

(54) ELECTRONIC DEVICE FOR GENERATING COMPOSITE IMAGE AND METHOD THEREOF

(71) Applicant: Samsung Electronics Co., Ltd., Suwon-si (KR)

(72) Inventors: Changsu Han, Suwon-si (KR); Sungoh Kim, Suwon-si (KR); Youngjo Kim, Suwon-si (KR); Hyunhee Park, Suwon-si (KR); Jungeun Lee, Suwon-si (KR); Sungjun Lim, Suwon-si (KR); Hyungju Chun, Suwon-si (KR); Jongbum Choi, Suwon-si (KR); Jonghun Won, Suwon-si (KR); Arang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 16/823,795

(22) Filed: Mar. 19, 2020

(65) Prior Publication Data

US 2020/0302583 A1 Sep. 24, 2020

(30) Foreign Application Priority Data

Mar. 19, 2019 (KR) .................. 10-2019-0031101

(51) Int. Cl.
*G06T 5/50* (2006.01)
*H04N 9/73* (2006.01)
(Continued)

(52) U.S. Cl.
CPC .................. *G06T 5/50* (2013.01); *G06T 3/40* (2013.01); *H04N 5/2352* (2013.01);
(Continued)

(58) Field of Classification Search
CPC ... G06T 5/50; G06T 3/40; G06T 2207/10028; G06T 2207/20104; G06T 2207/20221; H04N 5/2352; H04N 5/265; H04N 9/73
See application file for complete search history.

(56) References Cited

U.S. PATENT DOCUMENTS 6,999,117 B2 * 2/2006 Yamazaki ............ H04N 1/2112
 348/222.1
8,520,967 B2 * 8/2013 Bilcu ....................... G06T 5/50
 382/254

(Continued)

FOREIGN PATENT DOCUMENTS

JP 2001-268345 A 9/2001
JP 2015-233267 A 12/2015
(Continued)

OTHER PUBLICATIONS

Notification of Transmittal of the International Search Report and the Written Opinion of the International Searching Authority, or the Declaration dated Jul. 6, 2020 in connection with International Patent Application No. PCT/KR2020/003720, 9 pages.

(Continued)

*Primary Examiner* — Gregory M Desire

(57) ABSTRACT

An electronic device, a method and a storage medium are disclosed. The electronic device includes a processor and a memory operatively coupled to the processor. The processor is configured to receive a user input from an external electronic device. The processor is also configured to synthesize a first region that is a first partial region of a first raw image and a second partial region of a second raw image based on the user input to generate a composite raw image. The processor is further configured to modify at least one of a first attribute of the first raw image and a second attribute of the second raw image to generate a third attribute. Additionally, the processor is configured to calibrate the (Continued)

composite raw image using the third attribute to generate a composite image.

20 Claims, 16 Drawing Sheets

(51) Int. Cl.
    *G06T 3/40*     (2006.01)
    *H04N 5/235*     (2006.01)
    *H04N 5/265*     (2006.01)

(52) U.S. Cl.
    CPC ............... *H04N 5/265* (2013.01); *H04N 9/73* (2013.01); *G06T 2207/10028* (2013.01); *G06T 2207/20104* (2013.01); *G06T 2207/20221* (2013.01)

(56) References Cited

U.S. PATENT DOCUMENTS

| | | | |
|---|---|---|---|
| 10,088,989 B2* | 10/2018 | Rivard | H04N 5/2355 |
| 10,332,439 B2* | 6/2019 | Suh | G06F 3/04886 |
| 10,657,730 B2* | 5/2020 | Fyke | G06K 9/6267 |
| 10,757,384 B2* | 8/2020 | Douady-Pleven | H04N 9/646 |
| 10,928,997 B2* | 2/2021 | Yun | G06F 3/04845 |
| 2006/0033823 A1* | 2/2006 | Okamura | H04N 5/2355 348/254 |
| 2007/0147700 A1 | 6/2007 | Jeong et al. | |
| 2009/0141052 A1* | 6/2009 | Hamagishi | G02B 30/27 345/694 |
| 2013/0120607 A1* | 5/2013 | Manabe | H04N 9/76 348/223.1 |
| 2016/0217329 A1 | 7/2016 | Kang et al. | |
| 2017/0132820 A1 | 5/2017 | Zhou | |
| 2018/0196512 A1 | 7/2018 | Kim et al. | |
| 2019/0122339 A1 | 4/2019 | Moon et al. | |
| 2020/0213533 A1 | 7/2020 | Zhang | |
| 2020/0221103 A1 | 7/2020 | Kim et al. | |
| 2020/0226729 A1 | 7/2020 | Zhang | |

FOREIGN PATENT DOCUMENTS

| | | |
|---|---|---|
| KR | 10-2017-0112066 A | 10/2017 |
| KR | 10-2019-0010322 A | 1/2019 |
| KR | 10-2019-0013308 A | 2/2019 |
| KR | 10-2020-0009922 A | 1/2020 |
| WO | 2019047985 A1 | 3/2019 |

OTHER PUBLICATIONS

European Patent Office, "Supplementary European Search Report" dated Feb. 25, 2022, in connection with European Patent Application No. 20772796.7, 11 pages.

* cited by examiner

| Attribute |
|---|
| • Recognition Information(Index) |
| • Human Segmentation Map |
| • Confidence Map |
| • Depth Map |
| • Exposure time |
| • Lux |
| • ISO |
| • WB |
| • ... |

FIG.4

ELECTRONIC DEVICE FOR GENERATING COMPOSITE IMAGE AND METHOD THEREOF

CROSS-REFERENCE TO RELATED APPLICATION

This application is based on and claims priority under 35 U.S.C. § 119 to Korean Patent Application No. 10-2019-0031101, filed on Mar. 19, 2019, in the Korean Intellectual Property Office, the disclosure of which is incorporated by reference herein its entirety.

BACKGROUND

1. Field

The disclosure relates to an electronic device for generating a composite image and a method thereof.

2. Description of Related Art

An electronic device may obtain a raw image through its image sensor. When using the electronic device to synthesize some and/or all of raw images to generate a composite image, a user needs to separately adjust an attribute of each of raw images for a natural composite image.

Meanwhile, the electronic device may use a cloud system to provide an image backup function and a function of generating new media content to the user. The cloud system may process an image by applying a computer-based technology, such as an image matching technique or the like, which is difficult to be performed by the electronic device. The cloud system may synthesize some and/or all of raw images received from the electronic device to generate a composite image.

The above information is presented as background information only to assist with an understanding of the present disclosure. No determination has been made, and no assertion is made, as to whether any of the above might be applicable as prior art with regard to the present disclosure.

SUMMARY

After a cloud system calibrates respective raw images in the process of generating a composite image, when the cloud system synthesizes the respective calibrated images to generate the composite image, brightness, a white balance, or the like of the entire composite image may be unnatural.

Aspects of the present disclosure are to address at least the above-mentioned problems and/or disadvantages and to provide at least the advantages described below. Accordingly, an aspect of the present disclosure is to provide an electronic device for automatically an attribute for a composite image. Furthermore, accordingly, another aspect of the present disclosure is to provide an electronic device for generating a composite image by generating a composite raw image using a portion and/or all of each of raw images and calibrating the composite raw image using an attribute for the composite signal, rather than calibrating each of raw images to be synthesized.

In accordance with an aspect of the disclosure, an electronic device is provided. The electronic device may include a processor and a memory operatively coupled to the processor. The memory may store instructions, when executed, causing the processor to receive a user input from an external electronic device, synthesize a first region which is a partial region of a first raw image and at least a partial region of a second raw image based on the user input to generate a composite raw image, modify at least one of a first attribute of the first raw image and a second attribute of the second raw image to generate a third attribute, and calibrate the composite raw image using the third attribute to generate a composite image.

In accordance with another aspect of the disclosure, a method for generating a composite image in an electronic device is provided. The method may include receiving a user input, synthesizing a first region which is a partial region of a first raw image and at least a partial region of a second raw image based on the user input to generate a composite raw image, modifying at least one of a first attribute of the first raw image and a second attribute of the second raw image to generate a third attribute, and calibrating the composite raw image using the third attribute to generate a composite image.

In accordance with another aspect of the disclosure, a storage medium storing computer-readable instructions is provided. The storage medium may store the instructions, when executed by an electronic device, causing the electronic device to perform receiving a user input, synthesizing a first region which is a partial region of a first raw image and at least a partial region of a second raw image based on the user input to generate a composite raw image, modifying at least one of a first attribute of the first raw image and a second attribute of the second raw image to generate a third attribute, and calibrating the composite raw image using the third attribute to generate a composite image.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a drawing illustrating an attribute according to an embodiment disclosed in the disclosure;

With regard to description of drawings, similar components may be marked by similar reference numerals.

DETAILED DESCRIPTION

FIGS. 1 through 13B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
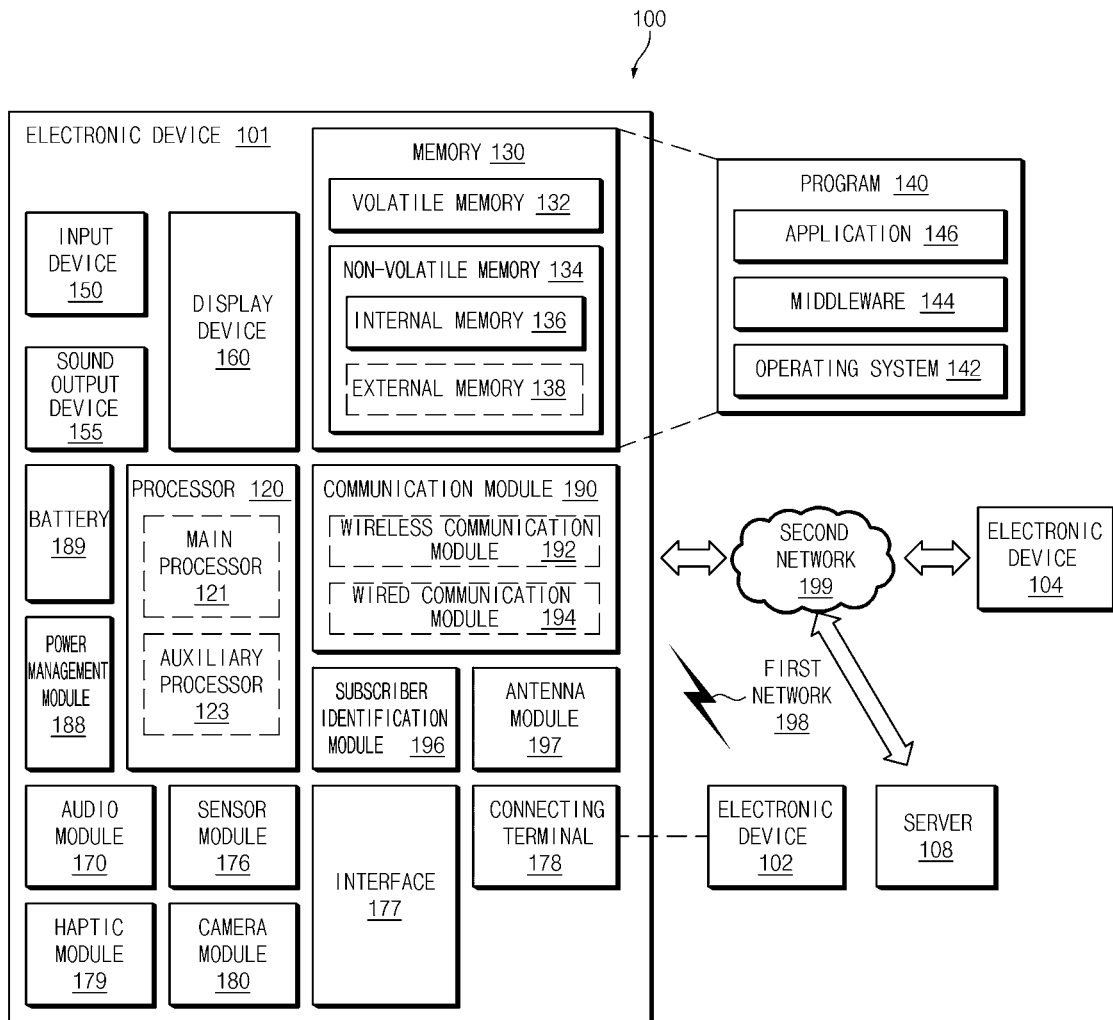
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
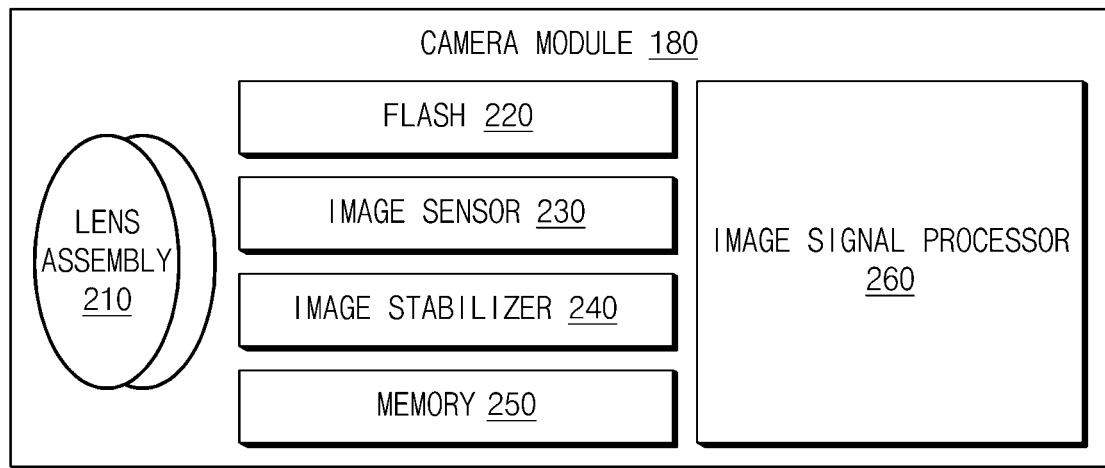
FIG. 2 is a block diagram illustrating the camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
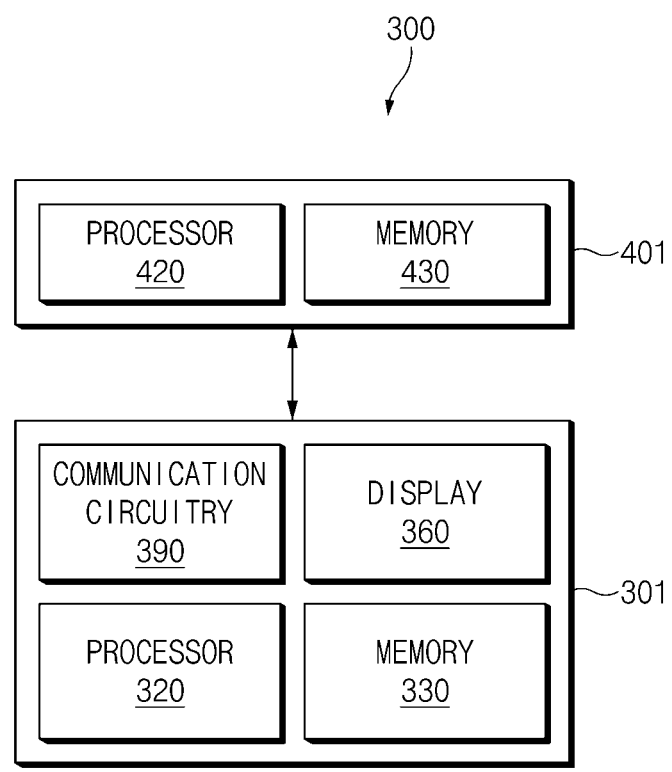
FIG. 3 is a block diagram illustrating an electronic device which generates a composite image and an external electronic device according to an embodiment disclosed in the disclosure.

FIG. 3 is a block diagram illustrating an electronic device 401 which generates a composite image and an external electronic device 301 according to an embodiment disclosed in the disclosure.

Referring to FIG. 3, a network environment 300 (e.g., a network environment 100 of FIG. 1) may include the electronic device 401 (e.g., an electronic device 101 of FIG. 1) and the external electronic device 301 (e.g., the electronic device 101 of FIG. 1 and/or a camera module 180 of FIG. 2). The electronic device 401 and the external electronic device 301 may be devices which differ physically or functionally from each other.

According to an embodiment, the electronic device 401 may include, for example, a cloud server, and the external electronic device 301 may include, for example, a smartphone, a tablet, a wearable device, a home appliance, or a digital camera.

The external electronic device 301 may include a processor 320 (e.g., a processor 120 of FIG. 1 and/or an image signal processor 260 of FIG. 2), a memory 330 (e.g., a memory 130 of FIG. 1 and/or a memory 250 of FIG. 2), a display 360 (e.g., a display device 160 of FIG. 1), and a communication circuitry 390 (e.g., a communication module 190 of FIG. 1).

According to an embodiment, the external electronic device 301 may further include at least one additional component other than the components shown in FIG. 3. The external electronic device 301 may further include at least one of, for example, an image sensor (e.g., an image sensor 230 of FIG. 2) for obtaining an original image, an input device (e.g., an input device 150 of FIG. 1) for receiving a user input, or a connecting terminal (e.g., a universal serial bus (USB) connector) used to be physically coupled with the electronic device 401.

The communication circuitry 390 may process data transmitted to the electronic device 401 or data received from the electronic device 401.

The display 360 may be electrically connected with the processor 320. The display 360 may visibly provide a variety of information. For example, the display 360 may display an image. In an embodiment, the display 360 may be a touchscreen display. When the display 360 is the touchscreen display, a user input may be received through the display 360.

The memory 330 may store a command, information, or data associated with an operation of the components included in the external electronic device 301. For example, the memory 330 may store instructions, when executed, causing the processor 320 to transmit a user input to the electronic device 401 and receive a composite image from the electronic device 401.

To perform an overall function of the external electronic device 301, the processor 320 may be operatively coupled with the communication circuitry 390, the memory 330, and the display 360. The processor 320 may include, for example, one or more processors. The one or more processors may include, for example, an image signal processor (ISP), an application processor (AP), or a communication processor (CP).

The processor 320 may store an original image, obtained for at least one object through the image sensor (e.g., the image sensor 230 of FIG. 2), in the memory 330. The obtained original image may include, for example, a picture or a still image included in a video.

The original image may be an image which is not preprocessed by the external electronic device 301 and/or the electronic device 401.

For example, a pixel of the original image may be represented in one of red, green, and blue (RGB) and may be represented in 8- to 16-bit depth. The original image may be a Bayer image processed by, for example, a color filter array (CFA) pattern. The original image may be, for example, an original image of a layer structure capable of detecting three colors from one pixel. The original image may be, for example, an original image of a dual pixel (DP) structure which includes different disparity information or difference phase difference information in one pixel. The original image may include, for example, two or more original images obtained through the same image sensor or two or more different image sensors. The two or more image sensors may include, for example, a dual sensor (e.g., RGB+RGB, RGB+mono, or wide+tele) or an array sensor.

The processor 320 may transmit a user input, input to the external electronic device 301, to the electronic device 401 via the communication circuitry 390.

The user input may include at least one of, for example, information that images a user wants to synthesize are first and second images, information about an object selected to be included in a composite image among at least one object included in the first image, information about an object selected to be included in the composite image among at least one object included in the second image, information about a location where the selected object of the first image is placed on the selected object of the second image, and information about a size where the selected object of the first image is occupied in the selected object of the second image.

The processor 320 may receive a composite image generated by the electronic device 401, via the communication circuitry 390. The processor 320 may display the received composite image on the display 360.

The electronic device 401 may include, for example, a processor 420 and a memory 430. The processor 420 and the memory 430 may be operatively coupled with each other. The electronic device 401 may further include at least one additional component other than the components shown in FIG. 3. For example, the electronic device 401 may include a communication module for communicating with the external electronic device 301 or a connecting terminal. According to an embodiment, the components of the electronic device 401 may be configured as the same entity or separate entities. The electronic device 401 may include, for example, the at least one processor 420.

The processor 420 may receive a user input from the external electronic device 301. The processor 420 may perform an overall function for generating a composite image, based on the user input.

The processor 420 may obtain a first raw image corresponding to the first image and a second raw image corresponding to the second image, based on a user input including information that an image to be synchronized is the first and second images.

In an embodiment, the raw image may refer to an original image. For example, the original image obtained through the image sensor may be transmitted to the electronic device 401 to be stored in the memory 430 and/or a separate storage. Alternatively, for example, the electronic device 401 may receive at least one original image selected to be synthesized by a user, together with a user input from the external electronic device 301.

In an embodiment, the raw image may refer to an image preprocessed by the external electronic device 301. For example, the external electronic device 301 may perform at least one of decompression, image quality enhancement, de-mosaic processing, or image format change for the original image obtained through the image sensor to generate a raw image. The raw image preprocessed and generated by the external electronic device 301 may be transmitted to the electronic device 401 to be stored in the memory 430 and/or the separate storage. Alternatively, for example, the electronic device 401 may receive at least one raw image selected to be synthesized by the user, together with a user input from the external electronic device 301.

In an embodiment, the raw image may refer to an image preprocessed by the electronic device 401. For example, the electronic device 401 may receive the original image obtained through the image sensor from the external electronic device 301. The electronic device 401 may perform at least one of decompression, image quality enhancement, de-mosaic processing, or image format change for the original image to generate a raw image. The raw image preprocessed and generated by the electronic device 401 may be stored in the memory 430 and/or the separate storage.

The processor 420 may identify a first region which is a partial region of the first raw image and a second region which is at least a partial region of the second raw image, based on a user input including information about objects selected from the first and second images to be included in a composite image.

In an embodiment, the processor 420 may perform an algorithm for analyzing information associated with a region of the first and second raw images. The processor 420 may perform, for example, object recognition, face recognition, a velocity vector, segmentation, or scene parsing for the first and second raw images. The processor 420 may identify the first region of the first raw image and the second region of the second raw image by performing the algorithm.

In an embodiment, the electronic device 401 may receive the first region of the first raw image and the second region of the second raw image, selected by the user, from the external electronic device 301. In other words, the processor 420 may receive only the first region and the second region, rather than all of the first and second raw images, together with a user input from the external electronic device 301.

The processor 420 may synthesize the first region and the second region to generate a composite raw image. The composite raw image may be, for example, an image, image processor (e.g., calibration) of which is not performed to generate the composite image.

The processor 420 may obtain a first attribute of the first raw image and a second attribute of the second raw image.

The processor 420 may obtain the first and second attributes from the memory 430 and/or the separate storage. In this case, the first and second attributes may be previously stored in the memory 430 and/or the separate storage.

In an embodiment, the processor 420 may receive the first and second attributes from the external electronic device 301.

FIG. 4 is a drawing illustrating an attribute according to an embodiment disclosed in the disclosure. Referring to FIG. 4, an attribute may include at least one of recognition information, a human segmentation map, a confidence map, a depth map, an exposure time, brightness (lux), ISO information, and a white balance value (WB). The items (e.g., the recognition information, the human segmentation map, the confidence map, the depth map, the exposure time, the brightness, the ISO information, and the white balance value) included in the attribute are illustrative, and an embodiment disclosed in the disclosure is not limited to the listed items. For example, the attribute may further include layer information, vector information, scene category information, and the like.

The recognition information may include, for example, information about whether at least one object identified on a raw image is a person, an animal, or an object. In addition, the recognition information may include information about a body part (e.g., a face or a body) of a person, a type of an animal, a type of an object, or the like in the at least one identified object. The recognition information may include information about a location (e.g., coordinates) on the raw image (or a screen), at which the at least one object identified on the raw image is disposed.

The human segmentation map may include location information, size information, and the like of a human object separately identified on a raw image.

The confidence map may include, for example, accuracy information about each region corresponding to at least one object of a raw image. The confidence map may include, for example, information about a blurring degree for a boundary of each region corresponding to the at least one object of the raw image or information about the necessity of blending with another region of the raw image.

A first attribute may include at least one of an image file identifier (ID), an image capture date, an image capture mode, an exposure mode, picture rotation, a side light mode, ISO information, a raw image format, an image size, a maximum aperture value, a focal length, and flash usage of a first raw image and recognition information, a human segmentation map, a confidence map, a depth map, an exposure time, brightness, ISO information, and a white balance value for each of at least one region corresponding to at least one object of the first raw image. A second attribute may include at least one of an image file ID, an image capture date, an image capture mode, an exposure mode, picture rotation, a side light mode, ISO information, a raw image format, an image size, a maximum aperture value, a focal length, and flash usage of a second raw image and recognition information, a human segmentation map, a confidence map, a depth map, an exposure time, brightness, ISO information, and a white balance value for each of at least one region corresponding to at least one object of the second raw image.

Referring again to FIG. 3, the processor 420 may modify at least one of the first attribute and the second attribute to generate a third attribute.

In an embodiment, the electronic device 401 may modify the first attribute on the basis of the second attribute to generate the third attribute. For example, the electronic device 401 may modify a white balance value of the first attribute to a white balance value of the second attribute. The first attribute having the modified white balance value may be treated as the third attribute.

In an embodiment, the electronic device 401 may modify the second attribute on the basis of the first attribute to generate the third attribute. For example, the electronic device 401 may modify a white balance value of the second attribute to a white balance value of the first attribute. The second attribute having the modified white balance value may be treated as the third attribute.

In an embodiment, the electronic device 401 may modify both the first attribute and the second attribute to generate the third attribute. For example, although the white balance value of the first attribute and the white balance value of the second attribute are the same as each other, to generate a composite image with high completeness, the electronic device 401 may modify the white balance value to generate the third attribute. For example, the electronic device 401 may include an average value of the white balance value of the first attribute and the white balance value of the second attribute in an item for a white balance value of the third attribute.

The white balance value is exemplified for the operation of generating the third attribute, but not limited thereto. For example, the electronic device 401 may modify at least one (e.g., brightness, an exposure time, or the like) of the items included in the attribute.

The processor 420 may calibrate the composite raw image using the third attribute to generate a composite image. The processor 420 may perform, for example, white balance adjustment, color adjustment, color filter arrangement interpolation, sharping, or image enhancement for the composite raw image using the third attribute to generate the composite image. The composite image may be in the form of, for example, a joint photographic experts group (JPEG), moving picture experts group (MPEG), or 360-degree image. The composite image may include, for example, a file for a picture, a video, or a still image of the video.

In an embodiment, when the third attribute is generated on the basis of the second attribute, the electronic device 401 may modify a white balance value of a first region to a white balance value of the second attribute to generate a composite image.

In an embodiment, when the third attribute is generated on the basis of the first attribute, the electronic device 401 may modify a white balance value of a second region to a white balance value of the first attribute to generate a composite image.

The processor 420 may store the composite image in the memory 430. The processor 420 may transmit the composite image to the external electronic device 301.

The memory 430 may store a command, information, or data associated with an operation of the components included in the electronic device 401. For example, the memory 430 may store instructions, when executed, causing the processor 420 to perform various operations described in the disclosure.

Figure 5:
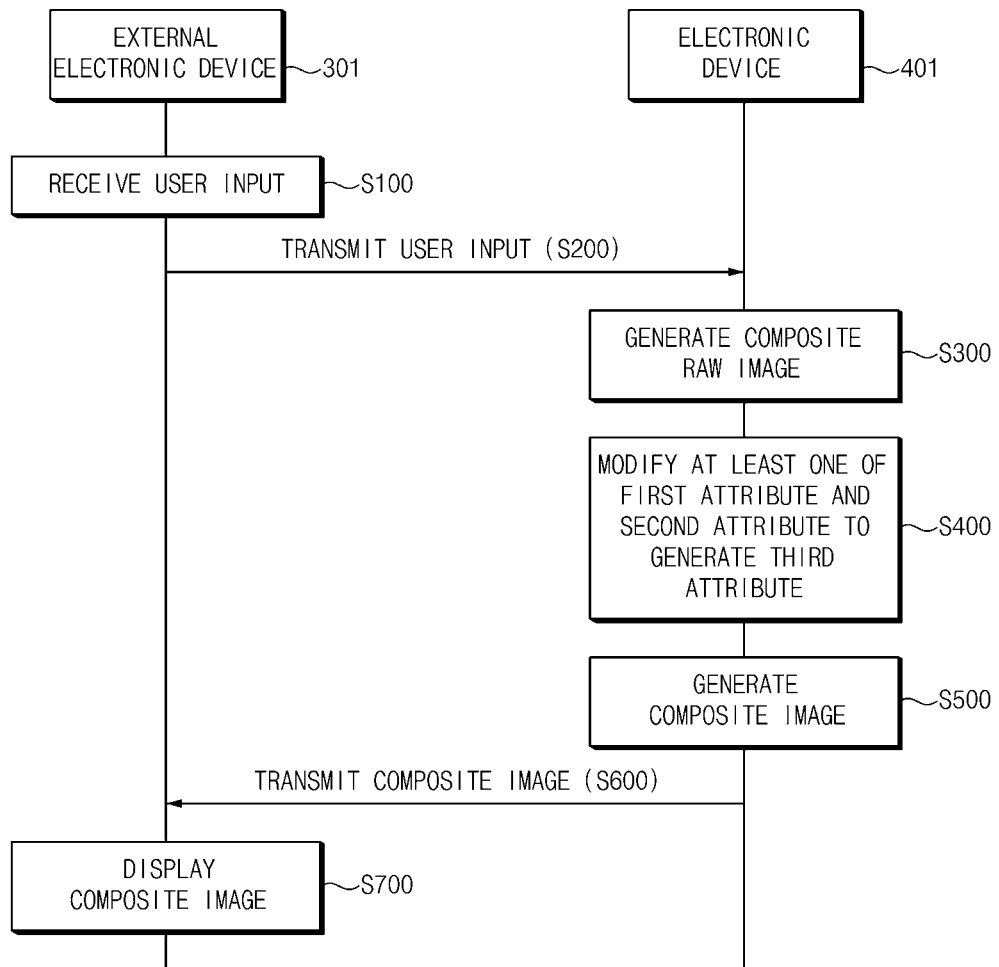
FIG. 5 is a signal sequence diagram illustrating a method for generating a composite image in an electronic device according to an embodiment disclosed in the disclosure.
Figure 6:
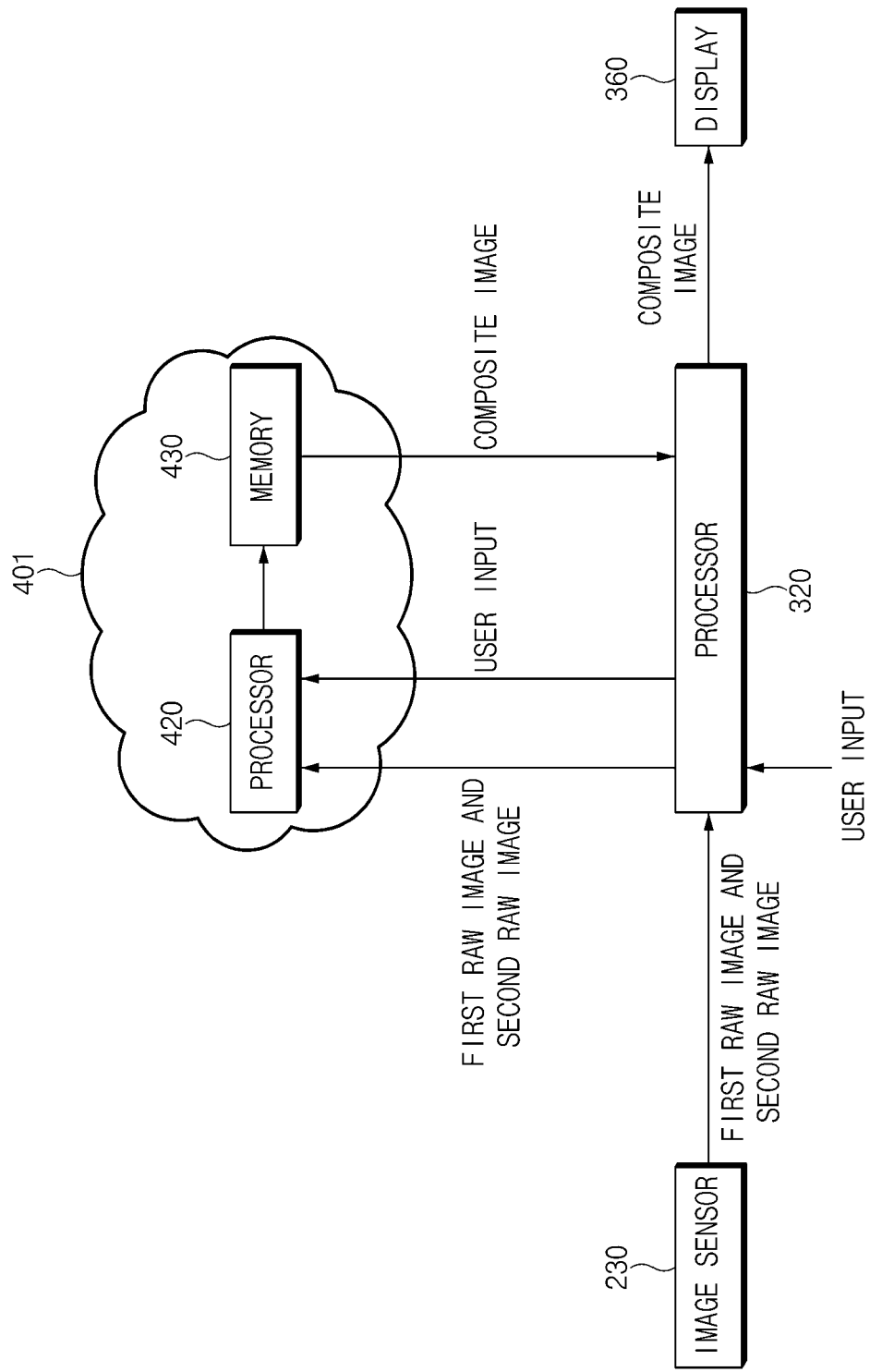
FIG. 6 is a conceptual diagram illustrating an operation of an electronic device and an external electronic device according to an embodiment disclosed in the disclosure.

FIG. 5 is a signal sequence diagram illustrating a method for generating a composite image in an electronic device 401 according to an embodiment disclosed in the disclosure. FIG. 6 is a conceptual diagram illustrating an operation of an electronic device 401 and an external electronic device 301 according to an embodiment disclosed in the disclosure. For clarity of description, the repetitive description of the foregoing description will be briefly described or omitted.

Hereinafter, it is assumed that an electronic device 401 of FIG. 3 performs a process of FIG. 5. An operation described as being performed by the electronic device 401 of FIG. 3 may be implemented with instructions (commands) performable (or executable) by a processor 420 of the electronic device 401. The instructions may be stored in, for example, a computer storage medium or a memory 430 of the electronic device 401 shown in FIG. 3.

Referring to FIGS. 3 to 6, in operation S100, the external electronic device 301 (e.g., a processor 320) may receive a user input.

For example, a user may select at least two images (e.g., a first image and a second image) to be synthesized through the external electronic device 301. The user may select at least one object to be included in a composite image, among at least one object included in the first image. Moreover, the user may select at least one to be included in the composite image, among at least one object included in the second image. The user may specify a size and location at which the at least one selected object of the first image is occupied in the at least one selected object of the second image. For example, when the user selects the first object on the first image and selects the second object on the second image, he or she may specify a location and size of the first object on the second object. For example, the user may place the first object located in the center of the first image on a location moved in a right direction from the center on the composite image. Furthermore, the user may adjust a size of the first object on the composite image to be smaller on the second image than the first image.

In operation S200, the electronic device 401 may receive the user input from the external electronic device 301.

In operation S300, the electronic device 401 may generate a composite raw image. The electronic device 401 may synthesize a first region which is a partial region of a first raw image and a second region which is at least a partial region of a second raw image based on a user input to generate the composite raw image.

Figure 7:
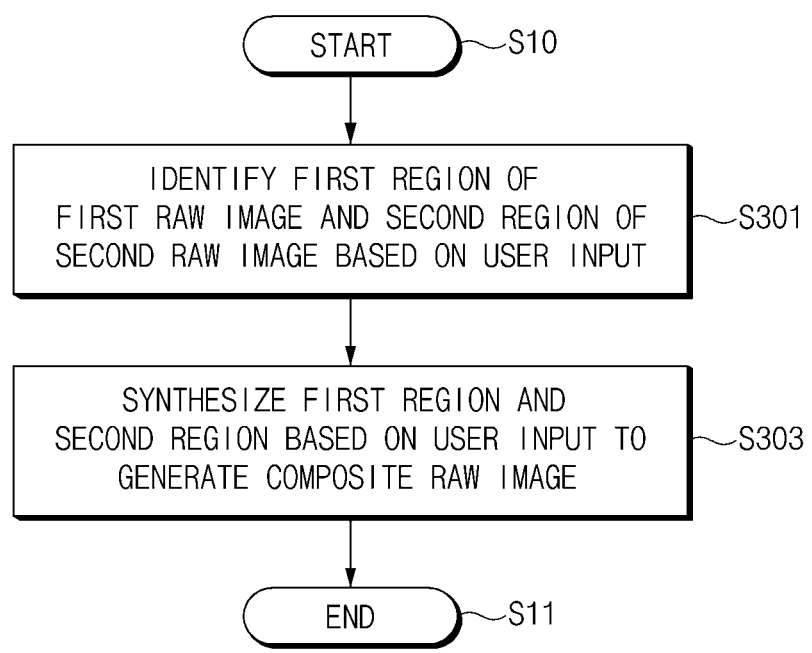
FIG. 7 is a flowchart illustrating operation S300 of FIG. 5.
Figure 8A:
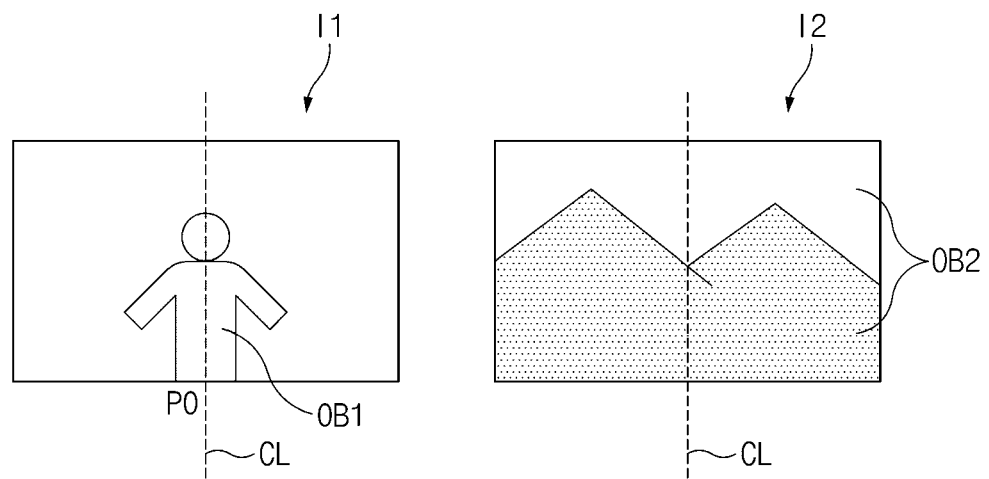
FIGS. 8A, 8B, and 8C are drawings illustrating an operation of an electronic device of FIG. 7.
Figure 8B:
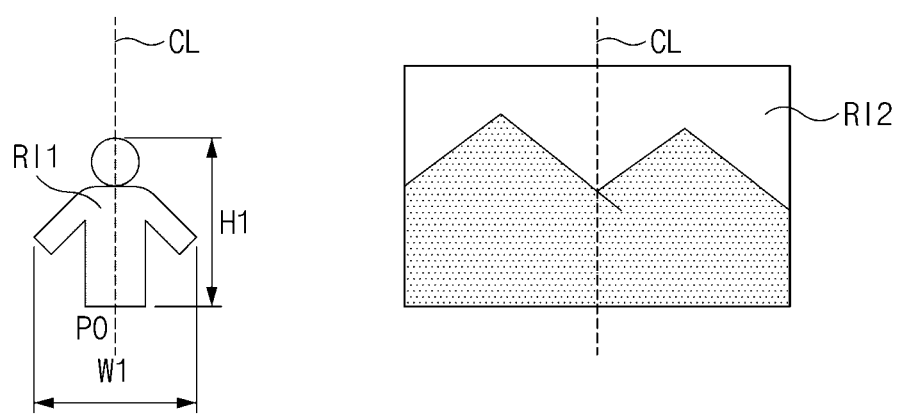
Figure 8C:
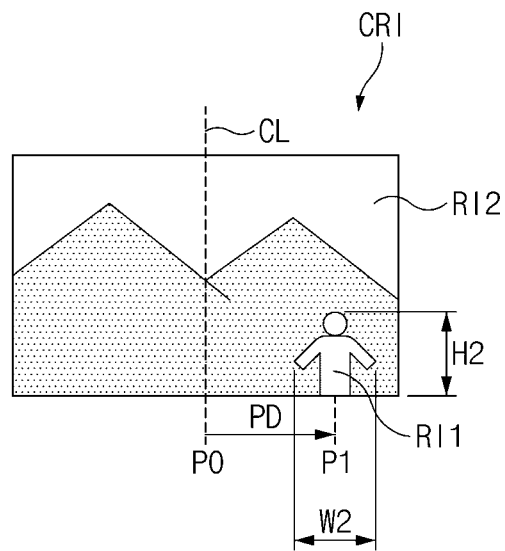

FIG. 7 is a flowchart illustrating operation S300 of FIG. 5. FIGS. 8A to 8C are drawings illustrating an operation of an electronic device of FIG. 7.

Referring to FIG. 7, in operation S301, the electronic device 401 may identify a first region of a first raw image and a second region of a second raw image based on a user input.

The first region may be, for example, a partial region of the first raw image. The partial region of the first raw image may be, for example, a region, corresponding to a first object selected to be synthesized by a user, among at least one object included in a first image. The first object may include, for example, one object (e.g., a person). The first object may include, for example, a plurality of objects (e.g., two persons).

The second region may be at least a partial region of the second raw image. In other words, the second region may be a partial region of the second raw image and may be the entire region of the second raw image. The at least a partial region of the second raw image may be a region corresponding to a second object selected to be synthesized by the user, among at least one object included in a second image. The second object may include, for example, one object (e.g., a mountain). The second object may include, for example, a plurality of objects (e.g., a mountain and the sky).

The user input may include, for example, information that images the user wants to synthesize are a first image and a second image. Furthermore, the user input may include, for example, information that the user wants to synthesize a first object of the first image and a second object of the second image.

Referring to FIG. 8A, the user input may include information that images the user wants to synthesize are a first image I1 and a second image I2. The first image I1 may include a first object OB1 (e.g., a person). The second image I2 may include a second object (e.g., a mountain and the sky). In the first image I1, the first object OB1 may be placed on a first position P0 identical to a center line CL. The center line CL may be a virtual line indicating a central position of a corresponding image.

Referring to FIG. 8B, the electronic device 401 may identify a first region RI1 of a first raw image and a second region RI2 of a second raw image based on a user input. The user input may include information that the user wants to synthesize the first object OB1 of the first image I1 and the second object OB2 of the second image I2.

In an embodiment, the electronic device 401 may obtain a first raw image corresponding to the first image and a second raw image corresponding to the second image, which are stored in a memory 430 and/or a separate storage, based on a user input. The electronic device 401 may identify the first region RI1 of the first raw image corresponding to the first object OB1 based on a user input and may identify the second region RI2 of the second raw image corresponding to the second object OB2 based on the user input.

In an embodiment, the electronic device 401 may receive a first raw image corresponding to the first image I1 and a second raw image corresponding to the second image I2, which are selected to be synthesized by the user, together with a user input from an external electronic device 301. The electronic device 401 may identify the first region RI1 of the first raw image corresponding to the first object OB1 based on a user input and may identify the second region RI2 of the second raw image corresponding to the second object OB2 based on the user input.

In an embodiment, the electronic device 401 may receive the identified first region RI1 of the first raw image and the identified second region RI2 of the second raw image together with the user input from the external electronic device 301.

The first region RI1 identified by the electronic device 401 may be placed on a first position P0. The first region RI1 identified by the electronic device 401 may have a first width W1 and a first height H1.

Referring again to FIG. 7, in operation S303, the electronic device 401 may synthesize the first region and the second region based on a user input to generate a composite raw image. The electronic device 401 may fail to perform image processing (e.g., calibration), such as white balance adjustment, color adjustment, color filter arrangement interpolation, sharping, or image enhancement, for each of the first region, the second region, and the composite raw image.

The user input may include, for example, size and location information of a first object in a composite image. The electronic device 401 may adjust a size of the first region based on the user input and may identify a location of the first region on the second region. The electronic device 401 may place the first region, the size of which is adjusted, on a position based on the user input in the second region to generate a composite raw image.

Referring to FIG. 8C, the electronic device 401 may generate a composite raw image CRI. The electronic device 401 may adjust a size and location of the first region RI1 based on a user input.

For example, the electronic device 401 may adjust a width of the first region RI1 from a first width (a first width W1 of FIG. 8B) to a second width W2 based on a user input. For example, the electronic device 401 may adjust a height of the first region RI1 from a first height (a first height H1 of FIG. 8B) to a second height H2 based on a user input. For example, the electronic device 401 may adjust a position of the first region RI1 from the first position P0 to a second position P1. The second position P1 may be a position moved by a certain distance PD from the center line CL which is the first position P0. In other words, the first region RI1 may be adjusted in size and location as compared with when the electronic device 401 identifies the first region RI1 on the first raw image (FIG. 8B).

The electronic device 401 may synthesize the first region RI1, the size and the location of which are adjusted, and the second region RI2 to generate the composite raw image CRI.

Referring again to FIGS. 3 to 6, in operation S400, the electronic device 401 may modify at least one of a first attribute and a second attribute to generate a third attribute.

In an embodiment, the first attribute and the second attribute may be stored in the memory 430 and/or the separate storage. When identifying the first raw image and the second raw image based on the user input, the electronic device 401 may obtain the first attribute and the second attribute from the memory 430 and/or the separate storage.

In an embodiment, the first attribute and the second attribute may be received from the external electronic device 301 together with a user input.

The electronic device 401 may modify at least one of the obtained first attribute and the obtained second attribute to generate the third attribute. Details about the operation where the electronic device 401 generates the third attribute will be described below with reference to FIGS. 9 to 11.

In operation 500, the electronic device 401 may calibrate the composite raw image using the third attribute to generate a composite image.

The electronic device 401 according to an embodiment disclosed in the disclosure may automatically generate the third attribute suitable for generating the composite image, such that there is no need to separately calibrate attributes of raw images (or images) the user wants to synthesize, thus reducing a time taken to generate the composite image. The electronic device 401 according to an embodiment disclosed in the disclosure may collectively calibrate the composite raw image using the third attribute to generate the composite image, thus enhancing completeness of the composite image. The electronic device 401 according to an embodiment disclosed in the disclosure may collectively calibrate the composite raw image using the third attribute to generate the composite image, thus achieving calibration which is uniform as a whole as compared with calibrating respective raw images (or respective images) and synthesizing the calibrated raw images (or the calibrated images).

In operation S600, the electronic device 401 may transmit the composite image to the external electronic device 301.

In operation S700, the external electronic device 301 may display the received composite image on a display 360.

Figure 9:
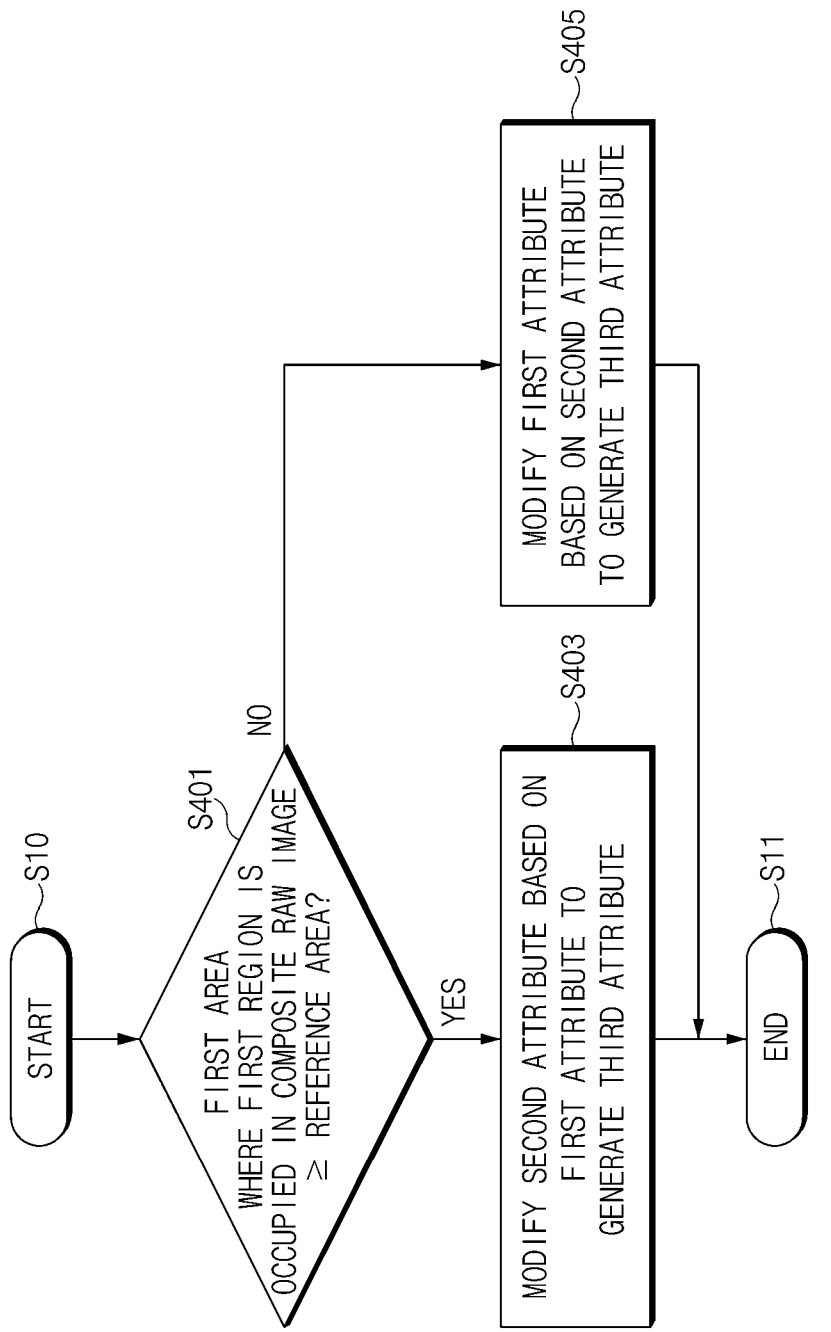
FIG. 9 is a flowchart illustrating a method for generating a third attribute in an electronic device according to an embodiment disclosed in the disclosure.

FIG. 9 is a flowchart illustrating a method for generating a third attribute in an electronic device 401 according to an embodiment disclosed in the disclosure. FIG. 9 is a flowchart illustrating operation S400 of FIG. 5 according to an embodiment. For clarity of description, the repetitive description of the foregoing description will be briefly described or omitted.

Referring to FIG. 9, in operation S401, an electronic device 401 of FIG. 3 may compare a first area where a first region is occupied in a composite raw image with a reference area. For example, the electronic device 401 may compare a first area where a first region RI1 is occupied in a composite raw image CRI of FIG. 8C with the reference area.

When the first area is greater than or equal to the reference area, in operation S403, the electronic device 401 may modify a second attribute based on a first attribute to generate a third attribute. For example, when the first area is greater than or equal to the reference area, the electronic device 401 may modify a white balance value and brightness of the second attribute to a white balance value and brightness of the first attribute. The second attribute, the white balance value and the brightness of which are modified, may be treated as the third attribute. In this case, the electronic device 401 may modify a white balance value and brightness of a second region to the white balance value and brightness of the first attribute based on the third attribute to calibrate a composite raw image.

When the first area is less than the reference area, in operation S405, the electronic device 401 may modify the first attribute based on the second attribute to generate the third attribute. When the first area is less than the reference area, the electronic device 401 may modify the white balance value and brightness of the first attribute to the white balance and brightness of the second attribute. The first attribute, the white balance and the brightness of which are modified, may be treated as the third attribute. In this case, the electronic device 401 may modify a white balance value and brightness of a first region to the white balance value and brightness of the second attribute based on the third attribute to calibrate a composite raw image.

Figure 10:
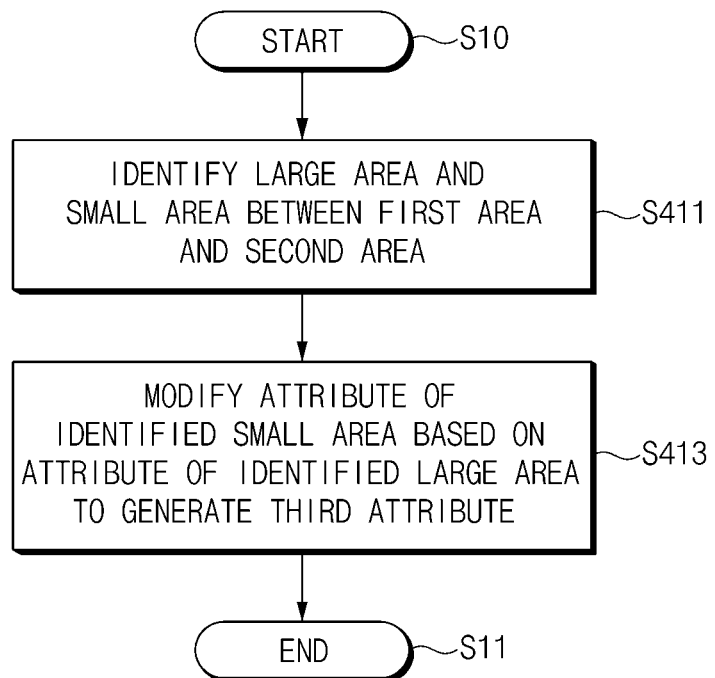
FIG. 10 is a flowchart illustrating a method for generating a third attribute in an electronic device according to an embodiment disclosed in the disclosure.

FIG. 10 is a flowchart illustrating a method for generating a third attribute in an electronic device 401 according to an embodiment disclosed in the disclosure. FIG. 10 is a flowchart illustrating operation S400 of FIG. 5 according to an embodiment. For clarity of description, the repetitive description of the foregoing description will be briefly described or omitted.

Referring to FIG. 10, in operation S411, an electronic device 401 of FIG. 3 may compare a first area where a first region is occupied in a composite raw image with a second area where a second region is occupied in the composite raw image. The electronic device 401 may compare the first area with the second area to identify a large area and a small area between the first area and the second area.

For example, referring to FIG. 8C, the electronic device 401 may compare a first area where a first region RI1 is occupied in a composite raw image CRI with a second area where a second region RI2 is occupied in the composite raw image CRI. In an example of FIG. 8C, the electronic device 401 may identify that the first area is a small area and that the second area is a large area.

Referring again to FIG. 10, in operation S413, the electronic device 401 may modify an attribute of the identified small area based on an attribute of the identified large area to generate a third attribute.

For example, referring to FIG. 8C, because the large area is the second area, the electronic device 401 may modify a first attribute based on a second attribute to generate the third attribute. In this case, the electronic device 401 may modify a white balance value and brightness of the first region RI1 to a white balance value and brightness of the second attribute based on the third attribute to calibrate the composite raw image CRI.

Figure 11:
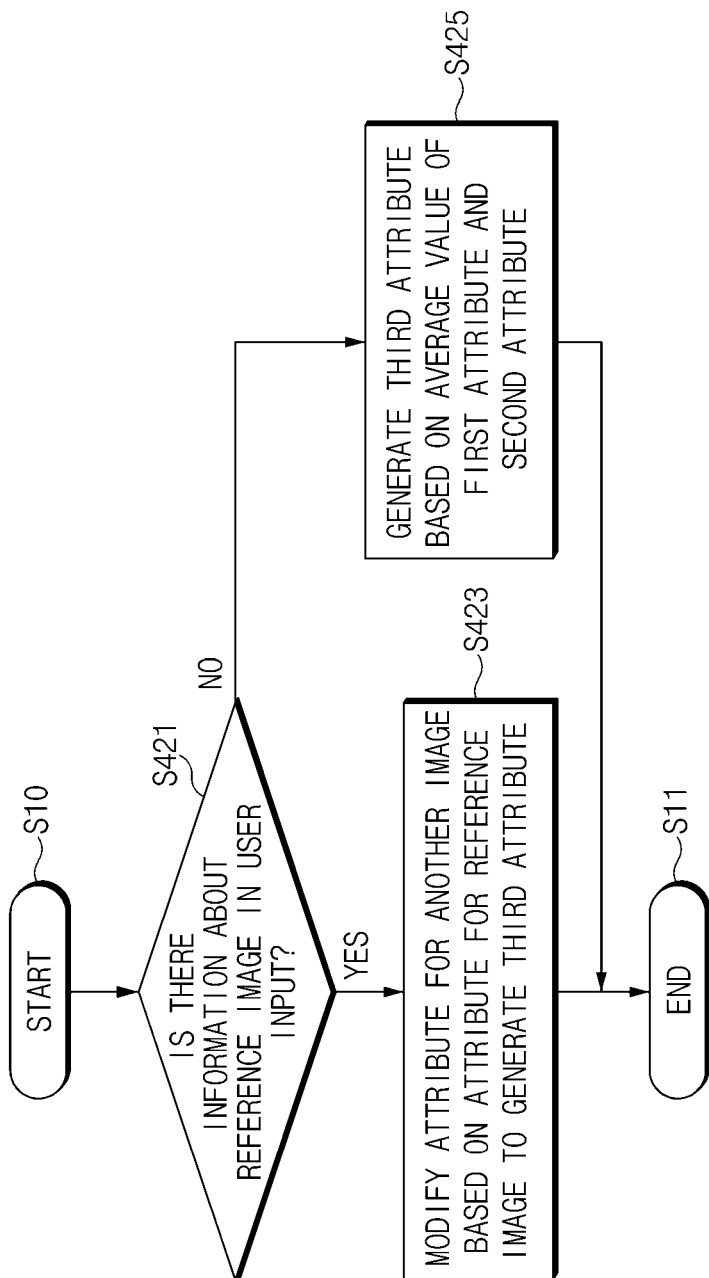
FIG. 11 is a flowchart illustrating a method for generating a third attribute in an electronic device according to an embodiment disclosed in the disclosure.

FIG. 11 is a flowchart illustrating a method for generating a third attribute in an electronic device 401 according to an embodiment disclosed in the disclosure. FIG. 11 is a flowchart illustrating operation S400 of FIG. 5 according to an embodiment. For clarity of description, the repetitive description of the foregoing description will be briefly described or omitted.

Referring to FIG. 11, in operation S421, an electronic device 401 of FIG. 3 may identify whether there is information about a reference image in a user input. The reference image may be an image corresponding to an attribute which becomes the norm, in generating a third attribute at the electronic device 401. The user may select the reference image through an external electronic device 301 of FIG. 3.

When the information about the reference image is identified in the user input, in operation S423, the electronic device 401 may modify an attribute for another image based on an attribute for the reference image to generate the third attribute. For example, when the reference image is a first raw image, the electronic device 401 may modify a second attribute for a second raw image based on a first attribute to generate the third attribute.

When the information about the reference image is not identified in the user input, in operation S425, the electronic device 401 may generate the third attribute based on an average value of the first attribute and the second attribute. For example, the electronic device 401 may set an average value of a white balance value of the first attribute and a white balance value of the second attribute to a value about an item for white balance of the third attribute.

Figure 12:
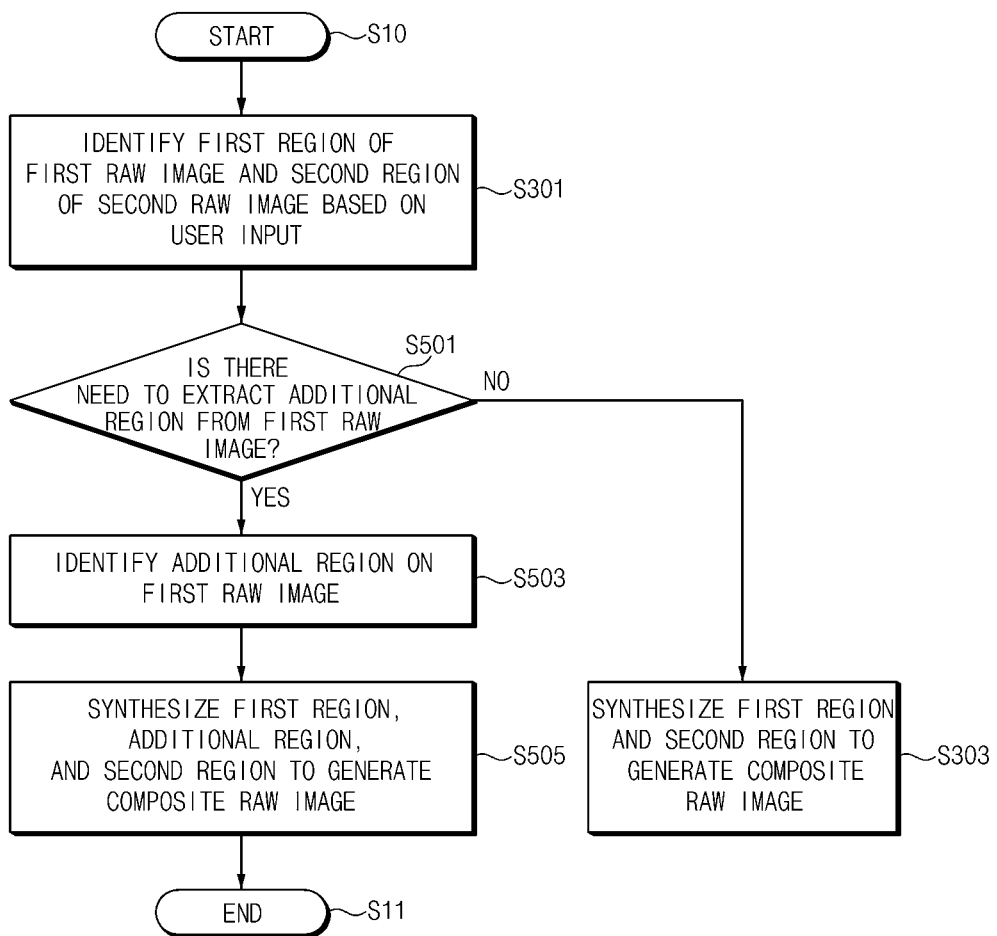
FIG. 12 is a flowchart illustrating a method for generating a composite image in an electronic device according to an embodiment disclosed in the disclosure.
Figure 13A:
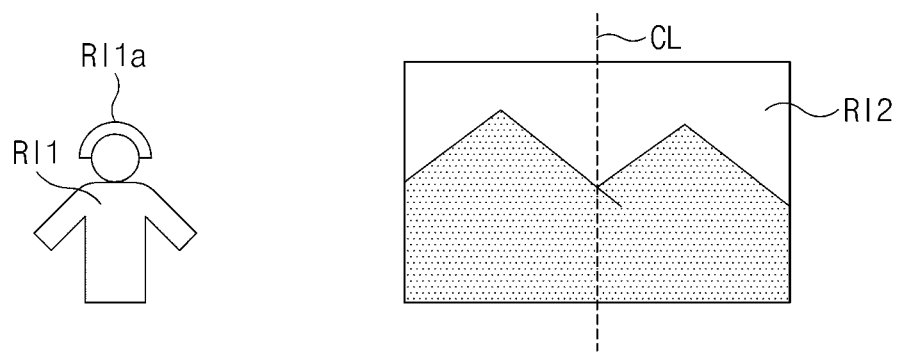
FIGS. 13A and 13B are drawings illustrating an operation of an electronic device of FIG. 12.
Figure 13B:
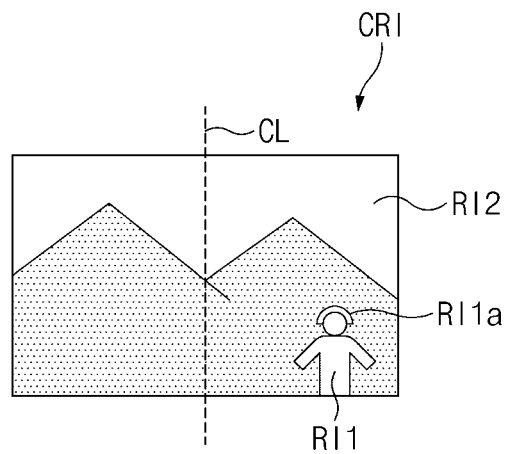

FIG. 12 is a flowchart illustrating a method for generating a composite image in an electronic device 401 according to an embodiment disclosed in the disclosure. FIGS. 13A and 13B are drawings illustrating an operation of an electronic device of FIG. 12. For clarity of description, the repetitive description of the foregoing description will be briefly described or omitted.

Referring to FIG. 12, in operation S301, an electronic device 401 of FIG. 3 may identify a first region of a first raw image and a second region of a second raw image based on a user input.

In operation S501, the electronic device 401 may determine whether there is a need to extract an additional region other than the first region from the first raw image. The additional region may be, for example, a region around the first region. The additional region may be, for example, a region directly adjacent to the first region. The electronic device 401 may determine whether there is a need to extract an additional region, for example, without intervention of a user input.

When it is not determined that there is the need to extract the additional region, in operation S303, the electronic device 401 may synthesize the first region and the second region to generate a composite raw image.

When it is determined that there is the need to extract the additional region, in operation S503, the electronic device 401 may further identify the additional region on the first raw image.

In operation S505, the electronic device 401 may synthesize the first region, the additional region, and the second region to generate a composite raw image.

Referring to FIGS. 8A and 13A, the electronic device 401 may identify and extract an additional region RI1a other than a first region RI1. For example, when a user wants to include a first object OB1 of a first image I1 in a composite image, the electronic device 401 may identify and extract the additional region RI1a other than the first region RI1 corresponding to the first object OB1 selected by the user. The additional region RI1a may be, for example, a region necessary to naturally represent a boundary of the first region RI1 on the composite image. For example, when a hair of a person who is the first object OB1 is present over the first region RI1 and a region (i.e., the additional region RI1a) except for the first region RI1 and when the user selects only the first region RI1 as only the first region RI1 is identified by the electronic device 401 and/or an external electronic device 301 of FIG. 3, the electronic device 401 may identify the additional region RI1a on the first raw image.

Referring to FIG. 13B, the electronic device 401 may synthesize the first region RI1, the additional region RI1a, and the second region RI2 to generate a composite raw image CRI. After the composite raw image CRI is generated, operation S600 and operation S700 described with reference to FIG. 5 may be performed (or executed).

An electronic device according to an embodiment disclosed in the disclosure may include a processor 320 (e.g., a processor 120 of FIG. 1 and/or an image signal processor 260 of FIG. 2) and a memory 330 (e.g., a memory 130 of FIG. 1 and/or a memory 250 of FIG. 2) operatively coupled to the processor. The memory may store instructions, when executed, causing the processor to receive a user input from an external electronic device, synthesize a first region which is a partial region of a first raw image and at least a partial region of a second raw image based on the user input to generate a composite raw image, modify at least one of a first attribute of the first raw image and a second attribute of the second raw image to generate a third attribute, and calibrate the composite raw image using the third attribute to generate a composite image.

In an embodiment, the instructions may cause the processor to, when a first area where the first region is occupied in the composite raw image is greater than or equal to a reference area, modify the second attribute based on the first attribute to generate the third attribute and, when the first area is less than the reference area, modify the first attribute based on the second attribute to generate the third attribute.

In an embodiment, the first attribute may include at least one of brightness, an exposure time, a white balance value, and a depth map of the first region, and the second attribute may include at least one of brightness, an exposure time, a white balance value, and a depth map of the at least a partial region of the second raw image. The instructions may cause the processor to, when the first area is greater than or equal to the reference area, modify the white balance value of the at least a partial region of the second raw image to the white balance value of the first region based on the third attribute to generate the composite image and, when the first area is less than the reference area, modify the white balance value of the first region to the white balance value of the at least a partial region of the second raw image based on the third attribute to generate the composite image.

In an embodiment, the instructions may cause the processor to compare a first area where the first region is occupied in the composite raw image with a second area where the at least a partial region of the second raw image is occupied in the composite raw image to identify a large area and a small area between the first area and the second area, when the identified large area is the first area, modify the second attribute based on the first attribute to generate the third attribute, and, when the identified large area is the second area, modify the first attribute based on the second attribute to generate the third attribute.

In an embodiment, the user input may include information about a location where the first region is placed in the at least a partial region of the second raw image and information about a size of the first region which is occupied in the at least a partial region of the second raw image. The instructions may cause the processor to place the first region based on the information about the location on the at least a partial region of the second raw image and adjust the size of the first region based on the information about the size to generate the composite raw image.

In an embodiment, the instructions may cause the processor to extract a second region from the first raw image and synthesize the first region, the second region, and the at least a partial region of the second raw image to generate the composite raw image.

In an embodiment, the instructions may cause the processor to, when a reference image is the first raw image based on the user input associated with the reference image, modify the second attribute based on the first attribute to generate the third attribute and, when the reference image is the second raw image, modify the first attribute based on the second attribute to generate the third attribute.

In an embodiment, the first attribute may include at least one of brightness, an exposure time, a white balance value, and a depth map of the first region, and the second attribute may include at least one of brightness, an exposure time, a white balance value, and a depth map of the at least a partial region of the second raw image. The instructions may cause the processor to, when the reference image is the first raw image, modify the white balance value of the at least a partial region of the second raw image to the white balance value of the first region based on third attribute to generate the composite image and, when the reference image is the second raw image, modify the white balance value of the first region to the white balance value of the at least a partial region of the second raw image based on third attribute to generate the composite image.

In an embodiment, the instructions may cause the processor to generate the third attribute based on an average value of the first attribute and the second attribute.

In an embodiment, the first attribute may include at least one of brightness information, an exposure time, a white balance value, and a depth map of the partial region of the first raw image, and the second attribute may include at least one of brightness information, an exposure time, a white balance value, and a depth map of the at least a partial region of the second raw image. The instructions may cause the processor to generate the third attribute based on an average value of the white balance value of the partial region of the first raw image and the white balance value of the at least a partial region of the second raw image.

A method for generating a composite image in an electronic device according to an embodiment disclosed in the disclosure may include receiving a user input, synthesizing a first region which is a partial region of a first raw image and at least a partial region of a second raw image based on the user input to generate a composite raw image, modifying at least one of a first attribute of the first raw image and a second attribute of the second raw image to generate a third attribute, and calibrating the composite raw image using the third attribute to generate a composite image.

In an embodiment, the generating of the third attribute may include, when a first area where the first region is occupied in the composite raw image is greater than or equal to a reference area, modifying the second attribute based on the first attribute to generate the third attribute and, when the first area is less than the reference area, modifying the first attribute based on the second attribute to generate the third attribute.

In an embodiment, the generating of the third attribute may include comparing a first area where the first region is occupied in the composite raw image with a second area where the at least a partial region of the second raw image is occupied in the composite raw image to identify a large area and a small area between the first area and the second area, when the identified large area is the first area, modifying the second attribute based on the first attribute to generate the third attribute, and, when the identified large area is the second area, modifying the first attribute based on the second attribute to generate the third attribute.

In an embodiment, the user input may include information about a location where the first region is placed in the at least a partial region of the second raw image and information about a size of the first region which is occupied in the at least a partial region of the second raw image. The generating of the composite raw image may include placing the first region based on the information about the location on the at least a partial region of the second raw image and adjusting the size of the first region based on the information about the size to generate the composite raw image.

In an embodiment, the user input may include information about a reference image. The generating of the third attribute may include, when the reference image is the first raw image, modifying the second attribute based on the first attribute to generate the third attribute and, when the reference image is the second raw image, modifying the first attribute based on the second attribute to generate the third attribute.

A storage medium may store computer-readable instructions according to an embodiment disclosed in the disclosure, the instructions, when executed by an electronic device, causing the electronic device to perform receiving a user input, synthesizing a first region which is a partial region of a first raw image and at least a partial region of a second raw image based on the user input to generate a composite raw image, modifying at least one of a first attribute of the first raw image and a second attribute of the second raw image to generate a third attribute, and calibrating the composite raw image using the third attribute to generate a composite image.

In an embodiment, the generating of the third attribute may include, when a first area where the first region is occupied in the composite raw image is greater than or equal to a reference area, modifying the second attribute based on the first attribute to generate the third attribute and, when the first area is less than the reference area, modifying the first attribute based on the second attribute to generate the third attribute.

In an embodiment, the generating of the third attribute may include comparing a first area where the first region is occupied in the composite raw image with a second area where the at least a partial region of the second raw image is occupied in the composite image to identify a large area and a small area between the first area and the second area, when the identified large area is the first area, modifying the second attribute based on the first attribute to generate the third attribute, and, when the identified large area is the second area, modifying the first attribute based on the second attribute to generate the third attribute.

In an embodiment, the user input may include information about a location where the first region is placed in the at least a partial region of the second raw image and information about a size of the first region which is occupied in the at least a partial region of the second raw image. The generating of the composite raw image may include placing the first region based on the information about the location on the at least a partial region of the second raw image and adjusting the size of the first region based on the information about the size to generate the composite raw image.

In an embodiment, the user input may include information about a reference image. The generating of the third attribute may include, when the reference image is the first raw image, modifying the second attribute based on the first attribute to generate the third attribute and, when the reference image is the second raw image, modifying the first attribute based on the second attribute to generate the third attribute.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1 st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., memory 430) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the electronic device may generate an attribute for a composite image, such that there is no need to separately calibrate attributes of raw images the user wants to synthesize, thus reducing a time taken to generate the composite image.

According to embodiments disclosed in the disclosure, the electronic device may generate a composite raw image and may calibrate the composite raw image using an attribute for a composite image to generate the composite image, thus enhancing completeness of the composite image.

In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   a processor; and
   a memory operatively coupled to the processor,
   wherein the processor is configured to:
      receive a user input from an external electronic device;
      synthesize a first region that is a first partial region of a first raw image and a second partial region of a second raw image based on the user input to generate a composite raw image;
      based on at least one of a first attribute of the first raw image and a second attribute of the second raw image, identify a third attribute; and
      calibrate the composite raw image using the third attribute to generate a composite image from the composite raw image,
      wherein the first attribute includes at least one of a first brightness value, a first exposure time, a first white balance value, and a first depth map of the first region, and
      wherein the second attribute includes at least one of a second brightness, a second exposure time, a second white balance value, and a second depth map of the second partial region of the second raw image.

2. The electronic device of claim 1, wherein the processor is further configured to:
   when a first area where the first region is occupied in the composite raw image is greater than or equal to a reference area, modify the second attribute based on the first attribute to identify the third attribute; and
   when the first area is less than the reference area, modify the first attribute based on the second attribute to identify the third attribute.

3. The electronic device of claim 2, wherein
   the processor is further configured to:
      when the first area is greater than or equal to the reference area, modify the second white balance value of the second partial region of the second raw image to the first white balance value of the first region based on the third attribute to generate the composite image; and
      when the first area is less than the reference area, modify the first white balance value of the first region to the second white balance value of the second partial region of the second raw image based on the third attribute to generate the composite image.

4. The electronic device of claim 1, wherein the processor is further configured to:
   compare a first area where the first region is occupied in the composite raw image with a second area where the second partial region of the second raw image is occupied in the composite raw image to identify a large area and a small area between the first area and the second area;
   when the identified large area is the first area, modify the second attribute based on the first attribute to identify the third attribute; and
   when the identified large area is the second area, modify the first attribute based on the second attribute to identify the third attribute.

5. The electronic device of claim 1, wherein:
   the user input includes first information about a location where the first region is placed in the second partial region of the second raw image and second information about a size of the first region that is occupied in the second partial region of the second raw image, and
   the processor is further configured to:
      place the first region based on the first information about the location on the second partial region of the second raw image; and
      adjust the size of the first region based on the second information about the size to generate the composite raw image.

6. The electronic device of claim 1, wherein the processor is further configured to:
   extract a second region from the first raw image; and
   synthesize the first region, the second region, and the second partial region of the second raw image to generate the composite raw image.

7. The electronic device of claim 1, wherein the processor is further configured to:

when a reference image is the first raw image based on the user input associated with the reference image, modify the second attribute based on the first attribute to identify the third attribute; and when the reference image is the second raw image, modify the first attribute based on the second attribute to identify the third attribute.

8. The electronic device of claim 7, wherein the processor is further configured to:

when the reference image is the first raw image, modify the second white balance value of the second partial region of the second raw image to the first white balance value of the first region based on the third attribute to generate the composite image; and when the reference image is the second raw image, modify the first white balance value of the first region to the second white balance value of the second partial region of the second raw image based on the third attribute to generate the composite image.

9. The electronic device of claim 1, wherein the processor is further configured to:

identify the third attribute based on an average value of the first attribute and the second attribute.

10. The electronic device of claim 9, wherein the processor is further configured to:

identify the third attribute based on an average value of the first white balance value of the first partial region of the first raw image and the second white balance value of the second partial region of the second raw image.

11. A method for generating a composite image in an electronic device, the method comprising:

receiving a user input;

synthesizing a first region that is a first partial region of a first raw image and a second partial region of a second raw image based on the user input to generate a composite raw image;

based on at least one of a first attribute of the first raw image and a second attribute of the second raw image, identifying a third attribute; and calibrating the composite raw image using the third attribute to generate the composite image from the composite raw image, wherein the first attribute includes at least one of a first brightness value, a first exposure time, a first white balance value, and a first depth map of the first region, and wherein the second attribute includes at least one of a second brightness, a second exposure time, a second white balance value, and a second depth map of the second partial region of the second raw image.

12. The method of claim 11, wherein identifying the third attribute includes:

when a first area where the first region is occupied in the composite raw image is greater than or equal to a reference area, modifying the second attribute based on the first attribute to identify the third attribute; and when the first area is less than the reference area, modifying the first attribute based on the second attribute to identify the third attribute.

13. The method of claim 11, wherein identifying the third attribute includes:

comparing a first area where the first region is occupied in the composite raw image with a second area where the second partial region of the second raw image is occupied in the composite raw image to identify a large area and a small area between the first area and the second area;

when the identified large area is the first area, modifying the second attribute based on the first attribute to identify the third attribute; and when the identified large area is the second area, modifying the first attribute based on the second attribute to identify the third attribute.

14. The method of claim 11, wherein:

the user input includes first information about a location where the first region is placed in the second partial region of the second raw image and second information about a size of the first region that is occupied in the second partial region of the second raw image, and generating the composite raw image includes:

placing the first region based on the first information about the location on the second partial region of the second raw image; and adjusting the size of the first region based on the second information about the size to generate the composite raw image.

15. The method of claim 11, wherein:

the user input includes information about a reference image, and identifying the third attribute includes:

when the reference image is the first raw image, modifying the second attribute based on the first attribute to identify the third attribute; and when the reference image is the second raw image, modifying the first attribute based on the second attribute to identify the third attribute.

16. A non-transitory computer-readable storage medium storing computer-readable instructions that, when executed, cause a processor of an electronic device to:

receive a user input;

synthesize a first region that is a first partial region of a first raw image and a second partial region of a second raw image based on the user input to generate a composite raw image;

based on at least one of a first attribute of the first raw image and a second attribute of the second raw image, identify a third attribute; and calibrate the composite raw image using the third attribute to generate a composite image from the composite raw image, wherein the first attribute includes at least one of a first brightness value, a first exposure time, a first white balance value, and a first depth map of the first region, and wherein the second attribute includes at least one of a second brightness, a second exposure time, a second white balance value, and a second depth map of the second partial region of the second raw image.

17. The non-transitory computer-readable storage medium of claim 16, wherein the computer-readable instructions that, when executed, cause the processor to identify the third attribute include computer-readable instructions that, when executed, cause the processor to:

when a first area where the first region is occupied in the composite raw image is greater than or equal to a reference area, modify the second attribute based on the first attribute to identify the third attribute; and when the first area is less than the reference area, modify the first attribute based on the second attribute to identify the third attribute.

18. The non-transitory computer-readable storage medium of claim 16, wherein the computer-readable instructions that, when executed, cause the processor to identify the third attribute include computer-readable instructions that, when executed, cause the processor to:
- compare a first area where the first region is occupied in the composite raw image with a second area where the second partial region of the second raw image is occupied in the composite raw image to identify a large area and a small area between the first area and the second area;
- when the identified large area is the first area, modify the second attribute based on the first attribute to identify the third attribute; and
- when the identified large area is the second area, modify the first attribute based on the second attribute to identify the third attribute.

19. The non-transitory computer-readable storage medium of claim 16, wherein:
- the user input includes first information about a location where the first region is placed in the second partial region of the second raw image and second information about a size of the first region that is occupied in the second partial region of the second raw image, and
- the computer-readable instructions that, when executed, cause the processor to generate the composite raw image include computer-readable instructions that, when executed, cause the processor to:
  - place the first region based on the first information about the location on the second partial region of the second raw image; and
  - adjust the size of the first region based on the second information about the size to generate the composite raw image.

20. The non-transitory computer-readable storage medium of claim 16, wherein:
- the user input includes information about a reference image, and
- the computer-readable instructions that, when executed, cause the processor to identify the third attribute include computer-readable instructions that, when executed, cause the processor to:
  - when the reference image is the first raw image, modify the second attribute based on the first attribute to identify the third attribute; and
  - when the reference image is the second raw image, modify the first attribute based on the second attribute to identify the third attribute.

* * * * *